US 9,274,994 B2

(12) United States Patent
Capezza et al.

(10) Patent No.: US 9,274,994 B2
(45) Date of Patent: Mar. 1, 2016

(54) METHOD AND SYSTEM FOR USING A STANDARD CONNECTOR TO DELIVER COMBINED DISPLAY, DATA AND POWER SIGNALS

(71) Applicant: Advanced Micro Devices, Inc., Sunnyvale, CA (US)

(72) Inventors: Steve Capezza, Dripping Springs, TX (US); Thomas L. Pratt, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 324 days.

(21) Appl. No.: 13/724,438

(22) Filed: Dec. 21, 2012

(65) Prior Publication Data

US 2013/0332642 A1 Dec. 12, 2013

Related U.S. Application Data

(60) Provisional application No. 61/658,742, filed on Jun. 12, 2012.

(51) Int. Cl.
*G06F 13/00* (2006.01)
*G06F 13/40* (2006.01)
*G06F 1/16* (2006.01)

(52) U.S. Cl.
CPC .......... *G06F 13/4081* (2013.01); *G06F 1/1632* (2013.01); *G06F 13/4068* (2013.01)

(58) Field of Classification Search
USPC .......................... 710/300–317, 62–64, 72–73
See application file for complete search history.

(56) References Cited

U.S. PATENT DOCUMENTS

| 7,841,910 | B2* | 11/2010 | Fields et al. ................... 439/680 |
| 7,865,629 | B1* | 1/2011 | Tantos et al. ..................... 710/11 |
| 2010/0295384 | A1* | 11/2010 | Kobayashi ..................... 307/154 |
| 2011/0141351 | A1* | 6/2011 | Yan ............................... 348/445 |
| 2011/0167187 | A1 | 7/2011 | Crumlin et al. |
| 2012/0011293 | A1* | 1/2012 | Cheng et al. ................... 710/303 |
| 2012/0062800 | A1 | 3/2012 | Sisto et al. |
| 2013/0275629 | A1* | 10/2013 | Hall ................................ 710/14 |
| 2013/0275635 | A1* | 10/2013 | Sip ................................ 710/105 |

FOREIGN PATENT DOCUMENTS

EP 2254055 A1 11/2010

OTHER PUBLICATIONS

International Search Report and Written Opinion for corresponding International application No. PCT/US2013/045158, dated Nov. 26, 2013, 7 pages.

* cited by examiner

*Primary Examiner* — Raymond Phan
(74) *Attorney, Agent, or Firm* — Volpe and Koenig, P.C.

(57) ABSTRACT

A system and method for providing a docking station that supports bi-directional high speed data, high bandwidth display, and power to a computing device utilizing a standard connector on the computing device are described. This includes a standard connector on the computing device including a standard digital display connector having a first set of two lanes and a second set of two lanes, a USB host that provides USB signals that enable bi-directional high speed data, a digital display source that provides digital display signals that enable high bandwidth display and couples digital display signals to the digital display connector on the second set of lanes, a multiplexor that receives signals from the USB host, receives signals from the digital display source, and couples the USB signals to the digital display connector on the first set of lanes, and a power subsystem that receives power via the digital display connector.

17 Claims, 4 Drawing Sheets

METHOD AND SYSTEM FOR USING A STANDARD CONNECTOR TO DELIVER COMBINED DISPLAY, DATA AND POWER SIGNALS

CROSS REFERENCE TO RELATED APPLICATION

This application claims the benefit of U.S. Provisional Application No. 61/658,742, filed Jun. 12, 2012, the entire contents of which is incorporated by reference as if fully set forth.

TECHNICAL FIELD

The disclosed embodiments are generally directed to cabling for electronic devices, and in particular, to a method and system for using a standard connector to deliver display, data and power.

BACKGROUND

Computer users want to connect more and more devices and displays to their platform. Couple this desire with a move towards smaller and thinner devices at the core of the platform, and there is a need for new connectors. Ultrathin computing devices have fewer input/output (I/O) connectors and more limited screen size due to the small size. One solution to this problem is a docking station. Generally, the traditional commercial pass-through connector offers a single docking connection that supports multiple devices. These traditional connectors are not operable with ultrathin platforms because the ultrathin platforms are too thin to incorporate into the designs.

Attempts to solve this shortcoming have included the use of multiple cables connecting various sources to the docking station. The multiple cables may include one for power, one for display, and another for data, for example. Another solution is a single proprietary connector that only works for certain devices. USB based docking, another resolution, needs compression for the visual experience which may be limiting and may provide limited bandwidth issues. Other solutions may increase the cost while offering limited display capabilities. Therefore, there is a need for a single standard connector to deliver full docking functionality, and using a connector that already exists on the platform.

SUMMARY OF EMBODIMENTS

Some embodiments provide a docking station that supports bi-directional high speed data, high bandwidth display, and power to a computing device utilizing a standard connector on the computing device. The system for providing a docking station that supports bi-directional high speed data, high bandwidth display, and power to a computing device utilizing a standard connector on the computing device includes a standard digital display connector (e.g., a DisplayPort (DP) connector) having a first set of two lanes and a second set of two lanes, a USB host that provides USB signals that enable bi-directional high speed data, a digital display source that provides digital display signals that enable high bandwidth display and couples digital display signals to the digital display connector on the second set of lanes, and a multiplexor that receives signals from the USB host, receives signals from the digital display source, and couples the USB signals to the digital display connector on the first set of lanes. The system may include a power subsystem that receives power via the digital display connector to power the computing device. The system may optionally include a first microcontroller for detecting whether the docking station is capable of enhanced communication. The microcontroller may determine whether the docking station power is supported before the power subsystem receives power.

The method for providing a dock that supports bi-directional high speed data, high bandwidth display, and power to a computing device utilizing a standard connector on the computing device includes inputting a USB signal within the two lanes of the digital display communication to provide bi-directional high speed data, providing a digital display signal using two lanes of the digital display communication to provide high bandwidth display, and powering, via the digital display communication, the computing device. The method may optionally include detecting whether enhanced communications is enabled. The microcontroller may determine whether the docking station power is supported before the power subsystem receives power.

BRIEF DESCRIPTION OF THE DRAWINGS

A more detailed understanding may be had from the following description, given by way of example in conjunction with the accompanying drawings wherein.

DETAILED DESCRIPTION

Some embodiments of certain aspects of the invention provide supporting bi-directional high speed data, high bandwidth display, and power to a computing device (e.g., a mobile device such as a computing device, laptop, tablet, phone, desktop computer, etc.) utilizing a standard connector on the computing device. A system and method for providing a docking station that supports bi-directional high speed data, high bandwidth display, and power to a computing device utilizing a standard connector on the computing device is described.

A system and method for providing a docking station that supports bi-directional high speed data, high bandwidth display, and power to a computing device utilizing a standard connector on the computing device is disclosed. The system for providing a docking station that supports bi-directional high speed data, high bandwidth display, and power to a computing device utilizing a standard connector on the computing device includes a standard digital display connector having a first set of two lanes and a second set of two lanes; a USB host that provides USB signals that enable bi-directional high speed data; a digital display source that provides digital display signals that enable high bandwidth display and couples digital display signals to the digital display connector on the second set of lanes; a multiplexor that receives signals from the USB host, receives signals from the digital display source, and couples the USB signals to the digital display connector on the first set of lanes; and a power subsystem that receives power via the digital display connector to power the computing device. The system may optionally include a first microcontroller for detecting whether the docking station is capable of enhanced communication. Enhanced communication includes levels of communication beyond the traditional digital display mode. These enhanced communications include at least the two lane mode described herein, the four lane mode described herein, and communications that are enabled as two or four lane mode while operating in standard digital display mode. The microcontroller may determine whether the docking station power is supported before the power subsystem receives power.

The method for providing a docking station that supports bi-directional high speed data, high bandwidth display, and power to a computing device utilizing a standard connector on the computing device includes inputting a USB signal within the two lanes of the digital display communication to provide bi-directional high speed data, providing a digital display signal using two lanes of the digital display communication to provide high bandwidth display, and powering, via the digital display communication, the computing device. The method may optionally include detecting whether enhanced communications is enabled. The microcontroller may determine whether the docking station power is supported before the power subsystem receives power.

Figure 1:
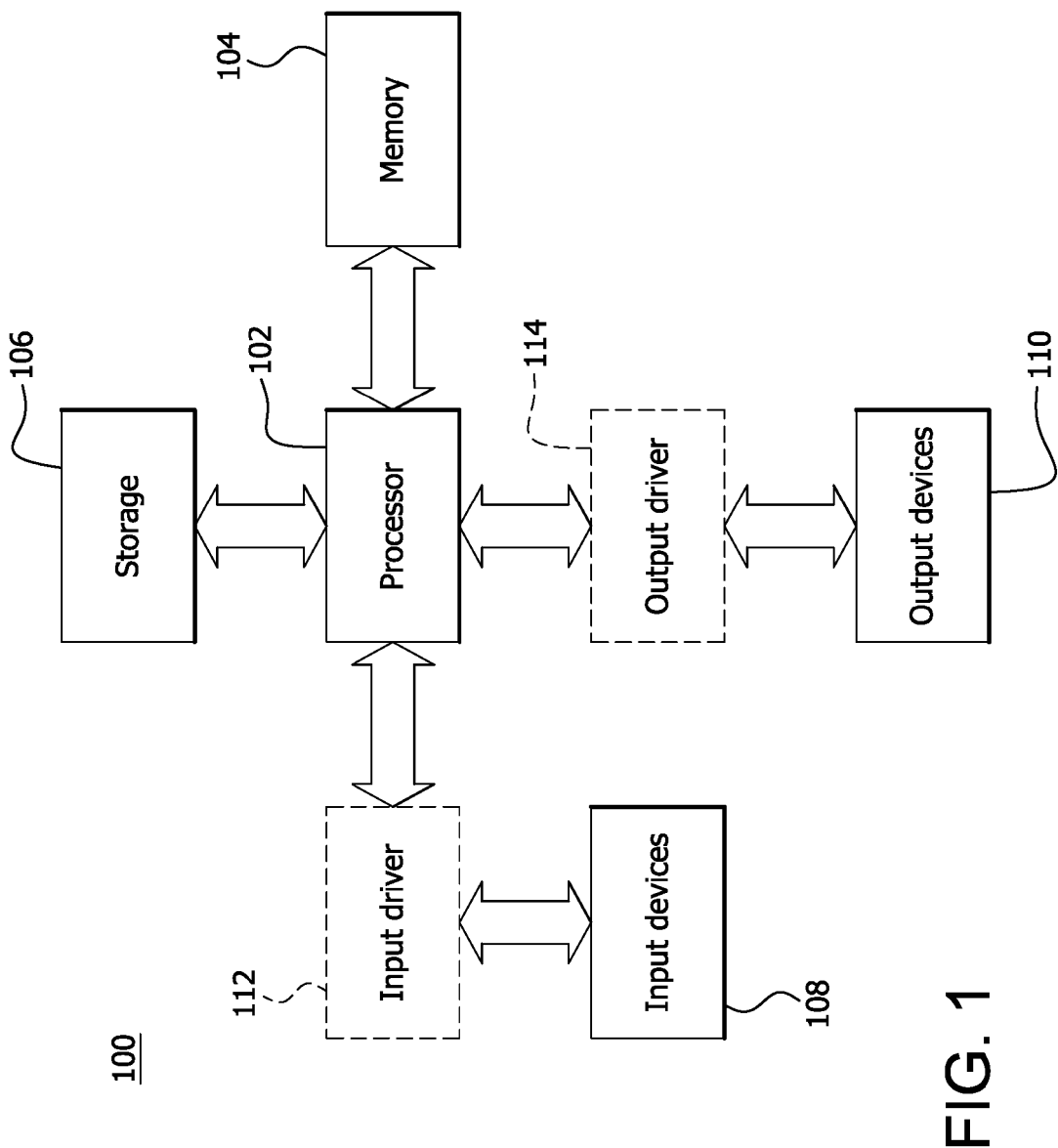
FIG. 1 is a block diagram of an example device in which one or more disclosed embodiments may be implemented.

FIG. 1 is a block diagram of an example device 100 in which one or more disclosed embodiments may be implemented. The computing device 100 may include, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage device 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
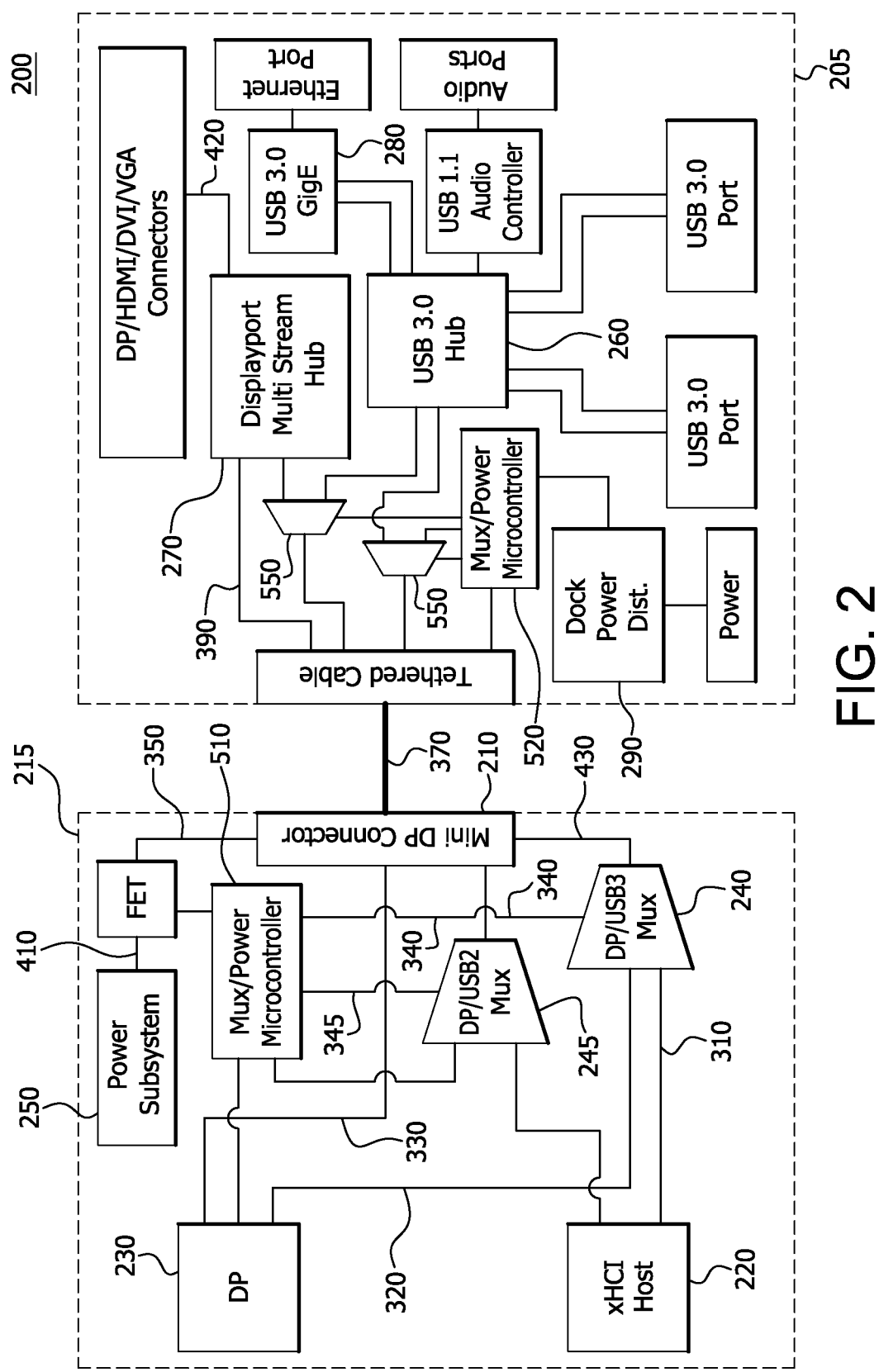
FIG. 2 illustrates a system for supporting bi-directional high speed data, high bandwidth display, and power to a computing device utilizing a standard connector on the computing device in accordance with some embodiments.

FIG. 2 illustrates a system for supporting bi-directional high speed data, high bandwidth display, and power to a computing device utilizing a standard connector on the computing device. FIG. 2 illustrates a system 200 incorporating the devices and cabling of the present invention. System 200 may provide the ability to connect output devices 110 of FIG. 1. System 200 includes a cabled dock 205 and a computing device 215. While the discussion herein uses terms such as tethered and cabled, the present discussion is directed to dockings with removable cables, hard wired cabling, and direct connect (i.e. no cables) even though these terms are used for ease of understanding. Setting aside the cabling and focusing on the devices first, computing device 215 may include a digital display interface connector 210 (which in the illustrated embodiment is a DisplayPort (DP) connector 210), universal serial bus (USB) host 220, a digital display source 230 (e.g., a DP source 230), a digital display/USB multiplexor 240 (e.g., a DP/USB multiplexor 240), and a power subsystem 250. Cabled dock 205 may include a USB hub 260, a digital display hub 270 (e.g., a DP hub 270), a network interface controller (NIC) 280, and a power distributor 290. Computing device 215 may be interconnected to dock 205 via interconnection 370. Interconnection 370 may include a tethered cable mating with a standard DP connector 210 on computing device 215. System 200 provides a docking station 205 that supports bi-directional high speed data, high bandwidth display, and power to computing device 215 utilizing a standard connector 210 on computing device 215. Standard connector 210 has a first set of two lanes and a second set of two lanes. USB host 220 provides USB3 signals that enable bi-directional high speed data. DP source 230 provides DP signals that enable high bandwidth display.

In a two lane mode, an enhanced configuration for providing both standard DP and USB signals is provided wherein multiplexor 240 receives signals from USB host 220 and from DP source 230, and couples the USB signals to DP connector 210 on the first set of lanes. DP source 230 couples DP signals to DP connector 210 for transmission on a second set of lanes. Power subsystem 250 receives power to power computing device 215 via DP connector 210.

A USB configuration may be used to provide USB 2.0, or other early USB signal, information at connector 210. This USB 2.0 configuration may include and additional multiplexor 245 that is controlled over control line 345 in a similar fashion to that described with respect to controller 340 controlling multiplexor 240. Such a USB 2.0 configuration may be used in addition to the configuration above, or instead of the configuration with USB signals and multiplexor 240. USB2 signals may be provided using Config1 and Config2 signals on connector 210, for example. Specifically, system 200 includes DP source 230, host 220, multiplexer 240, power 250 within computing device 215 and hub 270, hub 260, and power 290 within dock 205. System 200 may also include a USB2 multiplexor 245. Multiplexor 245 may be configured to receive USB2 signals from host 220 and provide the signals to connector 210. Connector 210 may provide the USB2 signals across cable 370 such as on the Config1 and Config2 signals (pins 13 and 14, for example).

In a four lane mode, an enhanced configuration for providing full DP over four lanes is provided wherein a tradeoff of the USB3 in the two lane mode occurs to provide additional lanes of DP. In the four lane mode, there are four lanes of DP and in enhancing the communication there are USB2 signals provided over the Config1 and Config2 signals as described above.

Alternatively, a standard DP mode may be utilized to provide a non-enhanced mode. In this mode, connector 210 provides four lanes of DP communication to dock 205. In this configuration, while USB host 220 provides USB signals that enable bi-directional high speed data and DP source 230 provides DP signals that enable high bandwidth display, multiplexor 240 receives signals from USB host 220, multiplexor 240 receives signals from USB host 220 and from DP source 230, and couples the DP signals to DP connector 210 on the first set of lanes. Multiplexor 245 may receive Config signals and USB2 signals and may couple Config signals to connector 210. DP source 230 couples DP signals to DP connector 210 for transmission on a second set of lanes.

System 200 leverages DP or Mini DisplayPort (mDP) connectors 210, including interconnection 370 to deliver data, display and power. DP connector 210 includes four differential pairs (lanes) that carry DP signals. In some embodiments, system 200 uses multiplexor 240 in computing device 215 to replace two DP lanes from DP source 230 with USB3 signals from host 220 (in two lane mode), and multiplexor 245 in computing device 215 to replace DP Config1 and Config2 signals from DP source 230 with USB2 signals from host 220 (in both two lane mode and four lane mode) when tethered docking station 205 is connected to computing device 215. This allows two lanes of DP to deliver information (in two lane mode) to one or more displays and full bandwidth USB at tethered dock 205.

Alternatively, in some embodiments, when a standard DP device is connected to computing device 215, system 200 via multiplexor 240 may allow all four lanes of DP connector 210 to connect from computing device 215 to tethered dock 205 per standard DP specifications.

In some embodiments, four lanes of DP may be connected from computing device 215 to tethered dock 205 per standard DP specifications in four lane mode, and multiplexor 245 may receive Config signals and USB2 signals and may couple USB2 signals to connector 210.

More specifically, USB host 220 and DP source 230, each may provide signals to multiplexor 240 that are delivered via connector 210. USB host 220 signals may be delivered via two pair of DP lanes on cable 370 via connector 210, while DP source 230 signals may be delivered via the other two pair of DP lanes on cable 370 via connector 210.

On the dock side 205, the signals may be parsed such that the USB signals may be delivered to USB hub 260 and the DP signals may be delivered to DP hub 270. Alternatively, USB hub 260 may select the USB portions of the signal and DP hub 270 may select the DP portions of the signal.

In an embodiment, hub 260 may be connected directly to the two lanes which carry USB signals when computing device 215 is in the docking mode. In this mode, as described herein, dock 205 will not see DP signals in these USB lanes. The two lanes directly from DP source 230 to connector 210 may be sent directly to DP hub 270.

Switch 550 may be configured as a hardwire of USB signal connection to USB hub 260 and DP signal connection to DP hub 270. Switch 550 may be configured as a set of multiplexors similar to multiplexors 240 and 245, for example. Multiplexor 240 is used to couple the signals onto the connection, and a similar multiplexor 550 may be used to select, such as multiplex, decouple, and/or dynamically switch, for example, the signals on the dock 205 side. Switch 550 may be controlled using controller 520, as needed to properly control signals. Additionally, USB2 signals may be included along connection 370. Switch 550 may be used to deliver the appropriate signals to USB hub 260.

Switch 550 may deliver two lanes that originated at multiplexor 240 to either USB hub 260 or DP hub 270, depending on the configuration. Similarly, switch 550 may deliver signals from multiplexor 245 to USB hub 260 or another location, such as DP hub 270 (connection not shown in FIG. 2), depending on the configuration. Switch 550 may deliver the two lanes that originated with DP source 230 to DP hub 270. Switch 550 may be designed to provide signals as appropriate to the respective receiving hub.

Standard DP connector 210 may include a connector that is generally defined for DP or mDP use. Connector 210 may be used as a multipurpose single connector. Connector 210 may provide USB 3.0, USB 2.0, power, and DisplayPort information using a single connector. By way of non-limiting example, DP connector 210 may have the pinout shown in Table 1.

TABLE 1

| Pin 1 | ML_Lane 0(p) | Lane 0 (positive) |
|---|---|---|
| Pin 2 | GND | Ground |
| Pin 3 | ML_Lane 0(n) | Lane 0 (negative) |
| Pin 4 | ML_Lane 1 (p) | Lane 1 (positive) |
| Pin 5 | GND | Ground |
| Pin 6 | ML_Lane 1(n) | Lane 1 (negative) |
| Pin 7 | ML_Lane 2 (p) | Lane 2 (positive) |
| Pin 8 | GND | Ground |
| Pin 9 | ML_Lane 2 (n) | Lane 2 (negative) |
| Pin 10 | ML_Lane 3 (p) | Lane 3 (positive) |
| Pin 11 | GND | Ground |
| Pin 12 | ML_Lane 3 (n) | Lane 3 (negative) |
| Pin 13 | CONFIG1 | connected to Ground |
| Pin 14 | CONFIG2 | connected to Ground |
| Pin 15 | AUX CH (p) | Auxiliary Channel (positive) |
| Pin 16 | GND | Ground |
| Pin 17 | AUX CH (n) | Auxiliary Channel (negative) |
| Pin 18 | Hot Plug | Hot Plug Detect |
| Pin 19 | Return | Return for Power |
| Pin 20 | DP_PWR | Power for connector (3.3 V 500 mA) |

This example provides a possible pinout for source-side connector and the sink-side connector pinout may have lanes 0-3 reversed in order. For example, lane 3 may be on pin 1(n) and 3(p) while lane 0 will be on pin 10(n) and 12(p).

USB host 220 may provide signals operating using USB 3. USB host 220 may provide signals operating using USB 2.0 or other earlier USB specifications. USB defines the cables, connectors and communications protocols used in a bus for connection, communication and power supply between computers and electronic devices. The design architecture of USB is asymmetrical in its topology, including a host 220, at least one hub 260, a multitude of downstream USB ports (not shown), and multiple peripheral devices (not shown) connected in a tiered-star topology. USB host 220 may be unitary or multiple USB hosts 220 may be used to implement multiple host controllers and each host controller may provide one or more USB ports. USB devices may be linked in series through one or more hubs 260.

USB device communication is based on pipes (logical channels). A pipe is a connection from the host controller to a logical entity, found on a device, and named an endpoint. Because pipes correspond 1-to-1 to endpoints, the terms are sometimes used interchangeably. USB supports several transfer types. These include isochronous transfers, which are transfers at some guaranteed data rate, but with possible data loss, for example real-time audio or video. Another supported transfer type is interrupt transfers, which includes devices that need guaranteed quick responses, such as pointing devices and keyboards. Bulk transfers are also supported. These include large sporadic transfers using all remaining available bandwidth, but with no guarantees on bandwidth or latency, such as file transfers. Control transfers are also supported. Control transfers include short, simple commands to the device, and a status response, used, for example, by the bus control pipe number 0.

There are two types of pipes: stream and message pipes depending on the type of data transfer. A stream pipe is a uni-directional pipe connected to a uni-directional endpoint that transfers data using an isochronous, interrupt, or bulk transfer. A message pipe is a bi-directional pipe connected to a bi-directional endpoint that is exclusively used for control data flow.

Transmitted signal levels are 0.0 to 0.3 volts for low and 2.8 to 3.6 volts for high in full-bandwidth and low-bandwidth modes, and −10 to 10 mV for low and 360 to 440 mV for high in hi-bandwidth mode. In FS mode, the cable wires are not terminated, but the HS mode has termination of 45Ω to ground, or 90Ω differential to match the data cable impedance, reducing interference due to signal reflections. USB 3.0 introduces two additional pairs of shielded twisted wire and new, mostly interoperable contacts in USB 3.0 cables, for them. They permit the higher data rate, and full duplex operation.

The USB 1.x and 2.0 specifications provide a 5 V supply on a single wire from which connected USB devices may draw power. The specification provides for no more than 5.25 V and no less than 4.75 V (5 V±5%) between the positive and negative bus power lines. For USB 3.0, the voltage supplied by low-powered hub ports is 4.45-5.25 V.

DP source 230 may include signals that are provided using DP or mini DisplayPort (mDP). DP, and mDP, is a digital display interface primarily used to connect a video source to a display device such as a computer monitor. DP relies on packetized data transmission to support both internal and external display connections. DP protocol is based on small data packets known as micro packets which embed the clock signal within the data stream. DP may be used to transmit audio and video simultaneously, but each one is optional and may be transmitted without the other. The video signal path supports 6 to 16 bits per color channel, and the audio path supports up to 8 channels of 24 bit 192 KHz uncompressed PCM audio that may encapsulate compressed audio formats in the audio stream. A bi-directional, half-duplex auxiliary channel carries device management and device control data, such as VESA EDID, MCCS, and DPMS standards. The interface may carry bi-directional USB signals. These specifications are provided by way of example only.

DP connector 210 may support 1, 2, or 4 differential data pairs (lanes), each with a raw bit rate of 1.62, 2.7, or 5.4 Gbit/s per lane with self-clock running at 162, 270, or 540 MHz. Data is 8b/10b encoded where each 8 bits of information are encoded with a 10 bit symbol. So the effective data rates after decoding are 1.296, 2.16, and 4.32 Gbit/s per lane (or 80% of the total). The effective bandwidth of DP is 17.28 Gbit/s, allowing increased resolutions, higher refresh rates, and greater color depth. Multiple independent video streams (daisy-chain connection with multiple monitors), support for stereoscopic 3D, increased auxiliary channel bandwidth (from 1 Mbit/s to 720 Mbit/s), support for more color spaces including xvYCC, scRGB and Adobe RGB 1998, and Global Time Code (GTC) for sub 1 µs audio/video synchronization may also be utilized.

DP source 230 may be connected to multiplexor 240 and to standard DP connector 210. This double connection may allow for two pairs of DP source 230 to be directed directly to connector 210 using connector 330. The other two lanes of the traditional DP connection may be switched for USB when docking station is connected and may be configured to pass-through when standard DP is connected. Connection 330 may include two DP differential pairs, such as ML_2p/n and ML_3p/n, for example, and may be on a circuit board.

DP/USB multiplexor 240 may have connected thereto an interconnection 340 that permits control of multiplexor 240. This connection 340 may provide access for a hardware and/or software controller for controlling multiplexor 240. Multiplexor 240 while being controlled over interconnection 340, and receiving signals from host 220 and source 230, may output DP signals on two of the lanes of DP connector 210. These signals may be indicative of those received from source 230.

DP/USB multiplexor 240 may be interconnected with standard DP connector 210 using connection 430. Interconnecting USB host 220 and DP/USB multiplexor 240 is connection 310. Connection 310 may include two USB differential pairs, such as TX +/− and RX +/−, for example. Interconnecting DP source 230 and DP/USB multiplexor 240 is connection 320. Connection 320 may include two DP differential pairs, such as ML_0P/n and ML_1P/N, for example. Multiplexor 240 may select USB host information using two replaced DP lanes or DP lanes to be delivered via connection 430 to connector 210. DP source 230 information may be provided using the remaining two differential pairs of DP lanes via connector 210 along connection 330.

Power subsystem 250 may provide battery charging power from the docking station 205 via an interconnection 350 between power subsystem 250 and standard DP connector 210. Power is flowing from dock 205 to computing device 215. Power subsystem 250 may also include the situation where power is sent to the computing device 215 through the DP connection, whether that power is used to charge the battery, or used to operate computing device 215 directly.

DP hub 270 receives signals from DP source 230 via connector 210. DP hub 270 is interconnected using connection 390, from switch 550 and/or connection 370, and outputs the display using HDMI, DP, DVI, or VGA, on interconnector 420, for example.

NIC 280 is interconnected with USB hub 260 and provides a NIC with a USB interface to allow many other devices to be added to the docking station enabling interconnection with computing device 215, as needed or desired. NIC 280 may provide access to a network, for example, and may include a computer network card.

Power distributor 290 may be an A/C adapter that provides power through connection 370 via interconnection 410 on dock 205 to power computing device 215 through a pin or pins on DP connector 210 to power subsystem 250 under the control of controller 520.

In addition, system 200 may include a detector 500 for detecting the ability for either computing device 215 and/or dock 205 to have the presently described enhanced communication and signal delivery. Detector 500 may include a first microcontroller 510 and second microcontroller 520. Microcontrollers 510, 520 may be placed on opposite sides of the computing device 215 and tethered dock 205 junction in order to monitor and determine when an enhanced connection of system 200 is made and supported. In the event that the enhanced connection of system 200 is supported, system 200 as described above may be used. In the event that the enhanced connection is not supported, the more traditional DP connection may occur.

Figure 3:
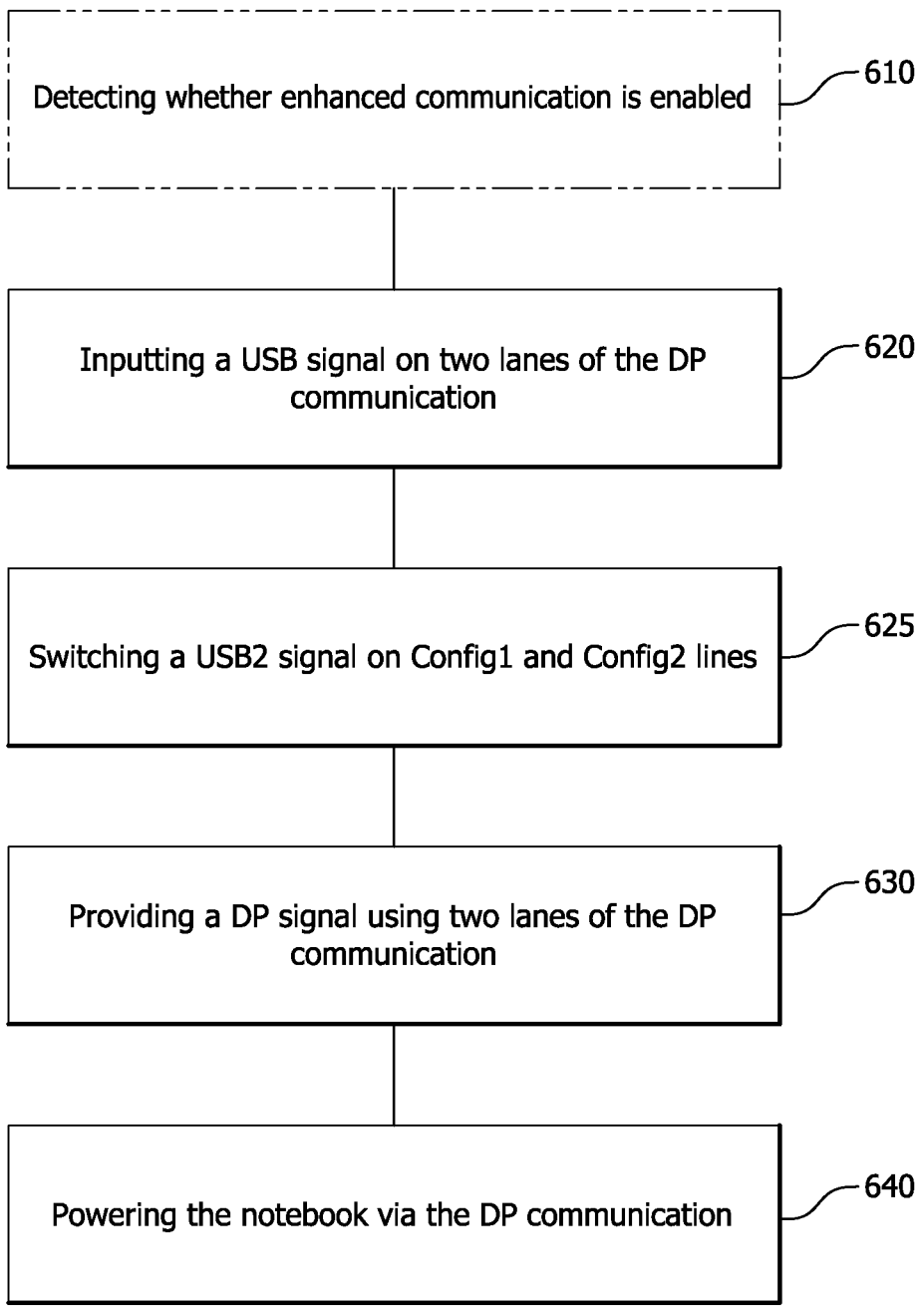
FIG. 3 illustrates a method of enabling a dock that supports bi-directional high speed data, high bandwidth display, and power to a computing device utilizing a standard connector on the computing device in accordance with some embodiments.

FIG. 3 illustrates a method of providing a dock that supports bi-directional high speed data, high bandwidth display, and power to a computing device utilizing a standard connector on the computing device. Method 600 optionally includes detecting whether enhanced communications is enabled 610, inputting a USB3 signal within the two lanes of the DP communication to provide bi-directional high speed data 620, switching a USB2 signal in place of Config1 and Config2 lines 625, providing a DP signal using two lanes of the DP communication to provide high bandwidth display 630, and powering, via the DP communication, the computing device 640.

Optionally, detecting, at step 610, may occur to determine whether enhanced communications is enabled. This detection may occur using communication between first microcontroller 510 and second microcontroller 520. Microcontrollers 510, 520 may monitor and determine when an enhanced connection of system 200 is made and supported. In addition to detecting whether enhanced communication is enabled, a determination through the detection may include the features that are supported by the enhanced communication. For example, two lane mode, four lane mode, and/or enhanced communication may include providing or not providing power. Microcontrollers 510, 520 may enable the supported enhanced features, such as by providing signals on control 340, 345 and by informing switch 550.

Inputting, at step 620, a USB signal within the two lanes of the DP communication to provide bi-directional high speed data may include a USB signal switched on to the two lanes of connection 430 by switching multiplexor 240.

Powering, at step 640, the computing device via the DP communication may include power supply 290 not always being connected to connection 370. Instead power supply 290 may be disconnected by default until dock 205 microcontroller 520 determines compatibility and switches power supply 290 on. Similarly, computing device 215 microcontroller 510 has determined the compatibility, in conjunction with microcontroller 520, and enables the power signal through connection 370 to power subsystem 250. Power may then be switched on.

Figure 4:
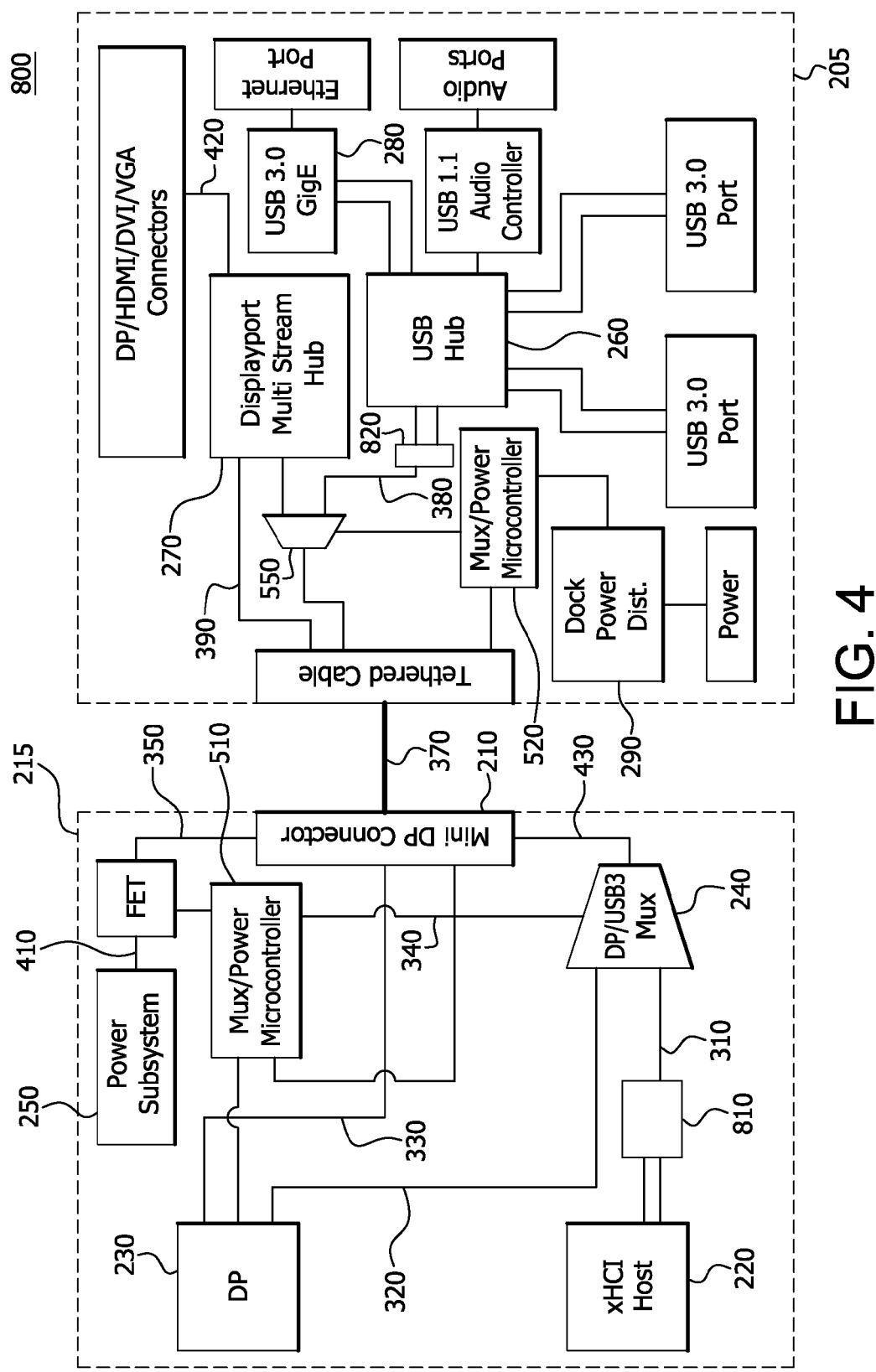
FIG. 4 illustrates a system for supporting bi-directional high speed data, high bandwidth display, and power to a computing device utilizing a standard connector on the computing device and incorporating USB2 into USB3 using a transaction translator in accordance with some embodiments.

FIG. 4 illustrates a system 800 that includes USB2 within USB3 by using a transaction translator. The transaction translator may be used to encapsulate USB2 signals onto the USB3 transport on the computing device side 215. This may allow USB2 and USB3 signals to be sent over USB3 lines. On the docking side 205, another transaction translator receives the USB3 signal and splits the USB3 and USB2 signals. The translator on each of the docking side 205 and the computing device side 215 may be identical as USB signals are bidirectional. In this configuration, the transaction translator 810 may receive signals from host 220 and connect both USB2 and USB3 signals. The output of translator 810 is a USB3 signal, which is transmitted to multiplexor 240.

On the dock 205 side, after processing, or passing, by multiplexor 550, the incoming signal 380 enters a translator 820, which in turn outputs USB3 and USB2 signals both directed to hub 260. In system 800, USB2 portions shown in FIG. 2 have been removed, such as multiplexor 245 and DP Config1 and Config2 signals may take the place of multiplexor 245 and may be transmitted to DP connector.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the disclosed embodiments.

The methods or flow charts provided herein may be implemented in a computer program, software, or firmware incorporated in a computer-readable storage medium for execution by a general purpose computer or a processor. In some embodiments, the computer-readable storage medium includes non-transitory signals. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system for providing a dock that supports bi-directional high speed data, high bandwidth display, and power to a computing device utilizing a standard connector on the computing device, the system comprising:
   a standard digital display connector having a first set of two lanes and a second set of two lanes;
   a USB host that provides USB signals that enable bi-directional high speed data;
   a digital display source that provides digital display signals that enable high bandwidth display and couples digital display signals to the digital display connector on the second set of lanes;
   a multiplexor that:
      receives signals from the USB host;
      receives digital display signals from the digital display source; and
      couples the USB signals to the digital display connector on the first set of lanes; and
   a power subsystem that receives power via the digital display connector to power the computing device.

2. The system of claim 1 wherein the digital display connector comprises a DisplayPort connector.

3. The system of claim 1 wherein the digital display signals comprise DisplayPort signals.

4. The system of claim 1 further comprising a first microcontroller for detecting whether the docking station is capable of enhanced communication.

5. The system of claim 1 further comprising a first set of two connections on the standard connector, wherein the multiplexor couples USB signals to the digital display connector on the first set of two connections.

6. The system of claim 1 wherein the USB signals on the first set of lanes comprises USB 3 signals.

7. The system of claim 1 wherein the standard digital display connector is connected to a docking station with at least one of a tethered cable, separable cable, and direct connection.

8. The system of claim 4 wherein the first microcontroller determines whether the docking station power is supported before the power subsystem receives power.

9. The system of claim 5 wherein the USB signals on the first set of two connections comprise USB 2 signals.

10. A system for providing a dock that supports bi-directional high speed data, high bandwidth display, and power to a computing device utilizing a standard connector on the computing device, the system comprising:
 a standard digital display connector having a first set of two lanes, a second set of two lanes, and a first set of two connections;
 a USB host that provides USB signals that enable bi-directional high speed data;
 a digital display source that provides digital display signals that enable high bandwidth display and couples digital display signals to the digital display connector on the second set of lanes;
 a plurality of multiplexors that:
  receives signals from the USB host;
  couples the USB signals to the digital display connector on the first set of connections;
  receives digital display signals from the digital display source; and
  couples the digital display signals to the digital display connector on the first set of lanes; and
 a power subsystem that receives power via the digital display connector to power the computing device.

11. The system of claim 10 wherein the digital display connector comprises a DisplayPort connector.

12. The system of claim 10 wherein the digital display signals comprise DisplayPort signals.

13. The system of claim 10 further comprising a first microcontroller for detecting whether the docking station is capable of enhanced communication.

14. The system of claim 10 wherein the USB signals on the first set of connections comprise USB 2 signals.

15. The system of claim 10 wherein the standard digital display connector is connected to a docking station with at least one of a tethered cable, separable cable, and direct connection.

16. The system of claim 13 wherein the first microcontroller determines whether the docking station power is supported before the power subsystem receives power.

17. A system for providing a dock that supports bi-directional high speed data, high bandwidth display, and power to a computing device utilizing a standard connector on the computing device, the system comprising:
 a standard digital display connector having a first set of two lanes and a second set of two lanes;
 a USB host that provides USB signals that enable bi-directional high speed data;
 a digital display source that provides digital display signals that enable high bandwidth display and couples digital display signals to the digital display connector on the second set of lanes;
 a first microcontroller for detecting whether the docking station is capable of enhanced communication; and
 a multiplexor that:
  receives signals from the USB host;
  receives digital display signals from the digital display source; and
  upon the first microcontroller detecting a lack of enhanced communication capability, couples the digital display signals to the digital display connector on the first set of lanes.

\* \* \* \* \*